United States Patent
Chaland

(10) Patent No.: US 10,434,734 B2
(45) Date of Patent: Oct. 8, 2019

(54) SIPES FOR LINING A TIRE MOULD AND ASSOCIATED MANUFACTURING METHOD

(71) Applicant: COMPAGNIE GENERALE DES ETABLISSEMENTS MICHELIN, Clermont-Ferrand (FR)

(72) Inventor: Stéphane Chaland, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/063,173

(22) PCT Filed: Dec. 7, 2016

(86) PCT No.: PCT/EP2016/080075
§ 371 (c)(1),
(2) Date: Jun. 15, 2018

(87) PCT Pub. No.: WO2017/102499
PCT Pub. Date: Jun. 22, 2017

(65) Prior Publication Data
US 2018/0370170 A1    Dec. 27, 2018

(30) Foreign Application Priority Data
Dec. 18, 2015   (FR) ..................... 15 62816

(51) Int. Cl.
*B29D 30/06*    (2006.01)
*B29C 33/38*    (2006.01)

(52) U.S. Cl.
CPC ...... *B29D 30/0606* (2013.01); *B29C 33/3842* (2013.01); *B29D 2030/0607* (2013.01); *B29D 2030/0613* (2013.01)

(58) Field of Classification Search
CPC ........ B29D 30/0606; B29D 2030/0613; B29C 33/3842
See application file for complete search history.

(56) References Cited

U.S. PATENT DOCUMENTS

| | | |
|---|---|---|
| 2002/0134202 A1 | 9/2002 | Domange |
| 2002/0139164 A1* | 10/2002 | Ishihara ................. B21D 37/20 72/326 |
| 2010/0300626 A1* | 12/2010 | Nguyen ................. B60C 11/12 157/13 |

FOREIGN PATENT DOCUMENTS

| | | | |
|---|---|---|---|
| JP | 2-303809 | * | 12/1990 |
| JP | 3-1910 | * | 1/1991 |
| JP | 4-353432 | * | 12/1992 |
| JP | 11-58386 | * | 3/1999 |
| JP | 2000 238514 | | 9/2000 |
| JP | 2014-151518 | * | 8/2014 |

* cited by examiner

*Primary Examiner* — James P Mackey
(74) *Attorney, Agent, or Firm* — Cozen O'Connor

(57) ABSTRACT

A composite lining element for a tire mold comprises first and second bodies 12, 14 which are able to mold, at least in part, the one same tread pattern in a tread of the tire and each delimiting an exterior molding surface 12b, 14b and an opposite interior surface 12a, 14a. The composite lining element further comprises at least a means 16 of assembling the first and second bodies. The interior surfaces 12a, 14 of the bodies are kept by the means of assembling at least locally in a separated position that creates an interior space 22.

20 Claims, 7 Drawing Sheets

SIPES FOR LINING A TIRE MOULD AND ASSOCIATED MANUFACTURING METHOD

RELATED APPLICATIONS

This is a U.S. National Phase Application under 35 USC 371 of International Application PCT/FR2016/080075 filed on Dec. 7, 2016.

This application claims the priority of French application no. 1562816 filed Dec. 18, 2015, the entire content of which is hereby incorporated by reference.

FIELD OF THE INVENTION

The present invention relates to a composite lining element which is intended to be used in a vehicle tire curing or vulcanizing mould, notably in a mould of the segmented type.

BACKGROUND OF THE INVENTION

A segmented mould mainly comprises two lateral shells that each mould one of the lateral sidewalls of the tire, and a plurality of segments that mould the tread of the said tire and are radially movable between an open position and a closed position of the mould. The shells and the segments define an interior moulding space that is intended to be brought into contact with the unvulcanized green form of the tire.

In order to form cuts or patterns on the tire tread, the mould segments notably comprise lining sipe blades projecting out into the interior moulding space. These sipe blades form a negative of the tread patterns that are to be moulded in the tread of the tire.

Conventionally, these lining sipe blades are formed by cutting and pressing or stamping a sheet-metal blank. However, these methods of manufacture are suited only to obtaining sipe blades having a thickness less than or equal to 2 millimeters, for example those used for moulding passenger vehicle tires.

Now, there is a need to manufacture lining sipe blades of greater thicknesses, for example for moulding tires for construction plant vehicles.

To this end, it is conceivable to produce lining sipe blades formed as one with the associated segment of the mould. However, this solution entails machining a solid block of material, and this is particularly expensive. Furthermore, the space separating two adjacent lining sipe blades may not be wide enough to allow the machine tool to pass.

The present invention aims to remedy these drawbacks.

SUMMARY OF THE INVENTION

One aspect of the invention relates to a composite lining element for a tire mould comprising first and second bodies which are able to mould, at least in part, the one same tread pattern in a tread of the tire and each delimiting an exterior moulding surface and an opposite interior surface.

The composite lining element further comprises at least a means of assembling the first and second bodies, the interior surfaces of the said bodies being kept by the said assembly means at least locally in a separated position in which an interior space is created between the said interior surfaces.

A "mould" means a collection of separate elements which, when brought closer together, make it possible to delimit an interior moulding space.

A "tire" means all types of resilient tread, whether or not it is subjected to an internal pressure.

A "lining element" means an element intended to allow the moulding of all or part of a cut or pattern in the tread of the tire.

"A pattern" in the tread means the space delimited by walls of material extending from the tread surface intended to come into contact with the roadway, facing one another, and distant from one another by a non-zero distance. A pattern may for example take the form of a groove or of a sipe in the tread. The terms bar or sipe blade are then used to qualify the lining element.

The use of two bodies that are distinct and assembled while being at least partially separated from one another makes it possible in a simple and economical way to obtain a lining element of a thickness greater than those of the lining elements of the prior art.

The lining element thus obtained is not a solid element created as a single piece but rather is obtained by assembling several parts in order to obtain the desired thickness. The lining element does not have any superfluous solid zones, making it easier to manufacture. It thus remains possible to manufacture the bodies of the lining element using low-cost production methods, for example cold-working methods such as pressing or stamping. Furthermore, the thickness of each of the elements of which the lining element is made can easily be adapted to suit the desired overall thickness for this element.

The particular structure of the lining element means that it is possible to provide a means of assembly shaped and arranged on the first and second bodies in order to allow the aforementioned interior space between the interior surfaces of these bodies to remain. The interior space is thus delimited by the said spacing means and by the interior surfaces of the bodies. With such a configuration, the separation between part of the interior surfaces of the bodies or the entirety of the said surfaces is obtained by the means of assembly. In this configuration, the means of assembly performs a dual function, namely that of obtaining the spacing of the bodies and that of assembling them.

Alternatively, with the particular structure of the lining element, it is possible to foresee a configuration in which the aforementioned interior space is delimited only by the interior surfaces of the first and second bodies.

According to another optional feature, the said means of assembly may collaborate with end portions of the first and second bodies. The said means of assembly may extend at least in part transversely with respect to the first and second bodies.

In one embodiment, the said means of assembly is interposed at least in part between the interior surfaces of the first and second bodies. In that case, it is possible to plan for these interior surfaces to be in contact only by means of the said means of assembly.

In one embodiment, the said means of assembly comprises at least one peripheral frame interposed between the interior surfaces of the first and second bodies. Such an intermediate frame makes it possible to ensure precise assembly of the first and second bodies. The lining element thus has a sandwich structure obtained by stacking the first and second bodies and the intermediate frame. The exterior peripheral edge of the intermediate frame may be identical in shape to the exterior peripheral edges of the bodies and lie flush with these edges.

By way of example, the thickness of each body may be comprised between 1 and 2 millimeters, and the thickness of the intermediate frame may be comprised between 2 and 4 millimeters. Depending on the desired overall thickness of the lining element, it is possible to provide several intermediate frames interposed between the first and second bodies.

In one alternative form of embodiment, the means of assembly may comprise at least two tongues facing each other and each extending one of the interior surfaces of one of the first and second bodies and coming to bear against the other body. Each tongue may be formed as one with the said body, i.e. as a monobloc component. In this case, the tongues may be obtained by bending the body or bodies. Alternatively, each tongue may be an element distinct from the associated body and attached to the said body.

The securing of the means of assembly and of the bodies of the lining element may be achieved by any appropriate means, for example by welding, bonding, clamping, pinning, etc.

In one embodiment, at least one synthetic material fills the said interior space. This filling material allows the said free interior space to be filled in order to avoid problems of insulation or of expansion of air under the effect of temperature during the moulding of the tread of the tire. This material may have a thermal conductivity substantially equal to the thermal conductivity of the material of the first and second bodies.

Furthermore, the filling material makes it possible to stiffen the lining element, thereby limiting the risk of deformation under the pressure of the unvulcanized green form of the tire. By way of indication, the filling material may for example be a low melting point alloy based on tin and bismuth, such as Cerrocast®.

In one embodiment, the first and second bodies are identical to one another. Thus, it is possible to use the same tooling for manufacturing the bodies. Alternatively, it is possible to plan for first and second bodies of different shapes, for example asymmetric, sawtooth, etc. shapes. The bodies may have a wavy or rectilinear or curved shape.

Another aspect of the invention also relates to a method for manufacturing a composite lining element for a tire mould, comprising the following steps:

a) cold-forming operations to obtain first and second bodies which are able to mould, at least in part, the one same tread pattern in a tread of the tire, then b) assembly of the said first and second bodies using at least a means of assembly that at least locally keeps interior surfaces of the said bodies in a separated position that creates an interior space.

BRIEF DESCRIPTION OF THE DRAWINGS

The present invention will be understood better from reading the detailed description of embodiments which are given by way of entirely non-limiting example and are illustrated by the appended drawings, in which.

DETAILED DESCRIPTION OF THE DRAWINGS

Figure 1:
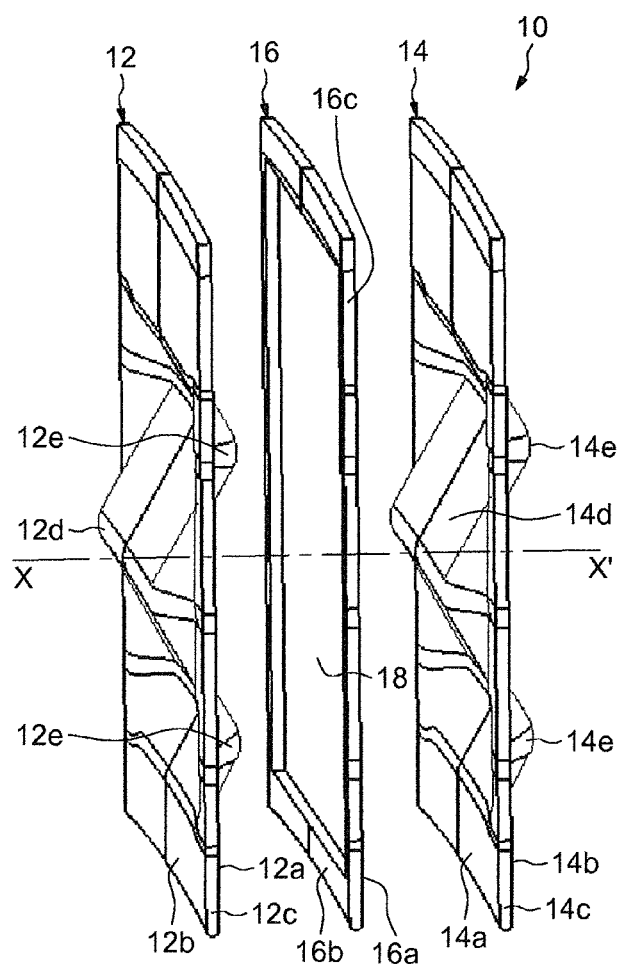
FIG. 1 is an exploded perspective view of a lining element according to a first exemplary embodiment.
Figure 2:
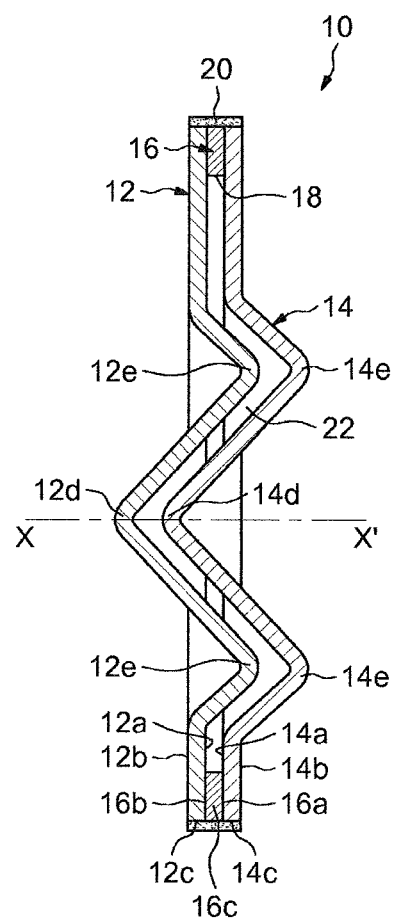
FIG. 2 is a view in cross section of the lining element of FIG. 1, in the assembled position.

FIGS. 1 and 2 depict a composite lining sipe blade 10 intended to be used in a tire curing or vulcanizing mould in order to form patterns in the tread of these tires.

The sipe blade 10 is obtained by assembling first and second bodies 12, 14 and an intermediate spacing frame 16 interposed between the said bodies.

In FIG. 1, the bodies 12, 14 and the frame 16 which constitute the composite sipe blade 10 are depicted in exploded perspective for the sake of clarity. The sipe blade 10 is obtained by stacking the bodies 12, 14 and the frame 16 which come to bear against one another along an axis of stacking X-X' as illustrated in FIG. 2. The axis X-X' extends in a direction assumed to be horizontal.

In the exemplary embodiment illustrated, because the bodies 12, 14 are identical to one another, just the one of them that bears the reference 12 will be described here, it being understood that the identical elements of the other body have the reference 14.

The body 12 comprises an interior frontal surface 12a and an opposite exterior frontal surface 12b delimiting the thickness of the said body. The interior frontal surface 12a comes to bear against the frame 16. The interior frontal surface 12a forms a surface for the positioning of the body 12 against the frame 16. The exterior frontal surface 12b forms a moulding surface intended to mould all or part of a tread pattern in the tread of the tire. The body 12 also comprises an exterior peripheral edge 12c connecting to the frontal surfaces 12a, 12b.

The body 12 also comprises protuberances 12d, 12e formed as one with the said body. The protuberance 12d projects out from the exterior frontal surface 12b and forms a recessed zone on the exterior frontal surface 12a. The protuberances 12e project out from the interior frontal surface 12a and form recessed zones on the exterior frontal surface 12b. The protuberances 12e here are arranged on either side of the protuberance 12d.

The frame 16 comes to bear, on one side, against the body 12 and, on the other side, against the body 14. There is no direct contact between the two bodies 12, 14. The bodies 12, 14 are held apart by means of the frame 16. In other words, the bodies 12, 14 are in contact only by means of the frame 16.

The frame 16 comprises opposite frontal surfaces 16a, 16b delimiting the thickness of the said frame. The frontal surface 16a of the frame bears against the interior frontal surface 14a of the body 14, whereas the frontal surface 16b bears against the interior frontal surface 12a of the body 12. The frame 16 is interposed between the interior frontal surfaces 12a, 14a of the bodies.

The frame 16 also comprises an exterior peripheral edge 16c connecting to the frontal surfaces 16a, 16b. The peripheral edge 16c is identical in shape to the edges 12c, 14c of the bodies and lies flush with the said edges.

The frame 16 also comprises a central through-hole 18. The hole 18 extends into the thickness of the frame and opens onto the frontal surfaces 16a, 16b. The hole 18 is sized in such a way as to allow the protuberances 12e and 14d of the bodies to pass. The protuberances 12e of the body 12 extend through the hole 18 and become lodged without contact in the complementary recessed zones formed on the interior frontal surface 14a of the body 14 by the protuberances 14e. Similarly, the protuberance 14d of the body 14 extends through the hole 18 and becomes lodged without contact in the complementary recessed zone formed on the interior frontal surface 12a of the body 12 by the protuberance 12d. In the exemplary embodiment illustrated, given the size of the hole 18, the frame 16 comes to bear against the interior frontal surfaces 12a, 14a of the bodies only in end portions of the said surfaces situated in the immediate vicinity of the peripheral edges 12c, 14c.

In order to secure the frame 16 and the bodies 12 and 14, the sipe blade 10 also comprises a peripheral bead of welding 20 covering the peripheral edges 12c, 14c and 16c. Alternatively, the securing of the components of the sipe blade 10 may be achieved by any other appropriate means, for example by bonding, clamping, pinning, etc.

As indicated previously, the frame 16 is interposed between the mutually-facing interior frontal surfaces 12a, 14a of the bodies 12, 14. Thus, these frontal surfaces 12a, 14a are kept in a spaced or parted position. In this parted position, an interior space 22 is created between the interior frontal surfaces 12a, 14a of the bodies. There is no direct contact between the two frontal surfaces 12a, 14a. The interior space 22 is delimited by the edge of the hole 18 in the frame and by the frontal surfaces 12a, 14a of the bodies. The interior space 22 is closed, i.e. not accessible from the outside of the sipe blade 10.

Arranging the spacer-forming frame 16 between the bodies 12, 14 makes it possible to obtain a lining sipe blade 10 that has a thickness suited to moulding tires for construction plant vehicles, while at the same time being made up of an assembly of several distinct components that can be manufactured at low cost. For example, the bodies 12, 14 are advantageously formed from a sheet-metal blank using cold-working methods such as pressing or stamping. The frame 16 may also be formed using such methods. In addition to providing the separation of the two bodies 12 and 14, the frame 16 makes it possible to achieve precise positioning and assembly of these bodies relative to one another.

Although the design illustrated in FIGS. 1 and 2 is particularly advantageous, the present invention is not restricted to a lining sipe blade 10 comprising an intermediate frame 16 in order to join the bodies 14, 16 together and in order to keep the interior frontal surfaces 12a, 14a of these bodies in a separated position.

Figure 3:
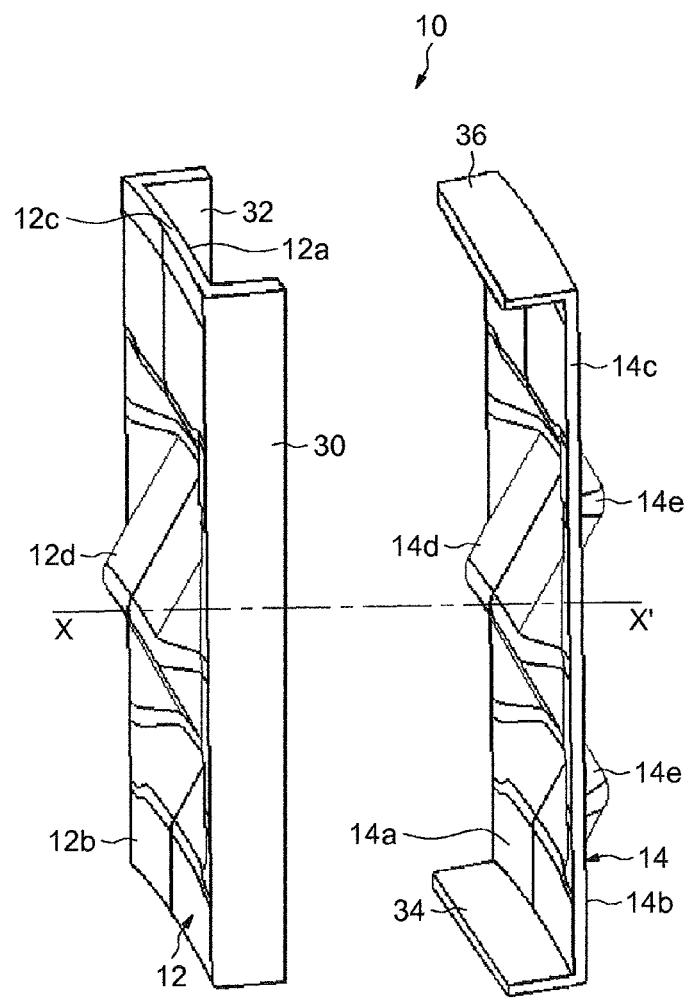
FIG. 3 is an exploded perspective view of a lining element according to a second exemplary embodiment.
Figure 4:
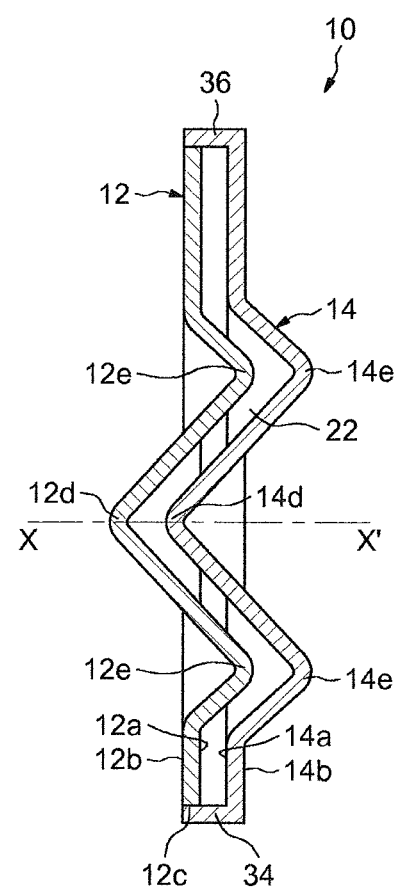
FIG. 4 is a view in cross section of the lining element of FIG. 2, in the assembled position.

In the exemplary embodiment illustrated in FIGS. 3 and 4, in which the elements that are identical bear the same references, the composite sipe blade 10 comprises tongues 30 to 36 formed on the bodies 12, 14 in order to keep the interior frontal surfaces 12a, 14a of the bodies 12, 14 apart.

In this example, the tongues 30, 32 and 34, 36 are formed as one with the respective bodies 12 and 14. These tongues may for example be obtained by bending the bodies. The tongues 30, 32 extend from opposite longitudinal sides of the peripheral edge 12c of the body 12 and extend the interior frontal surface 12a towards the body 14. The tongues 30, 32 are identical and face one another. The tongues 30, 32 extend transversely to the axis X-X'. The tongues 34, 36 extend from opposite transverse sides of the peripheral edge 14c of the body 14 and extend the interior frontal surface 14a towards the body 12. The tongues 34, 36 are identical and face one another. The tongues 34, 36 extend parallel to the axis X-X'.

The tongues 30, 32 and 34, 36 are shaped in such a way as to achieve assembly of the sipe blade 10 by fitting-together. When the sipe blade 10 is in the assembled position, the tongues 30, 32 bear against the opposite longitudinal sides of the peripheral edge 14c of the body and the adjacent edges of the tongues 34, 36. These tongues 34, 36 bear against the opposite transverse sides of the peripheral edge 12c of the body 12 and the adjacent edges of the tongues 30, 32. In order to assemble the bodies 12 and 14 it is possible to weld the tongues 30 to 36 together.

Alternatively, it may be possible to plan for an arrangement of the tongues 30 to 36 on the bodies 12, 14 which is different from that illustrated. For example, it is conceivable to arrange the tongues 30, 34 on the body 12 and the tongues 32, 36 on the body 14. Alternatively, the tongues 30 to 36 could be provided on just one of the two bodies 12, 14. In another alternative form, the tongues could be offset so as to be interposed between the interior frontal surfaces 12a, 14a of the bodies 12, 14.

In a similar way to the first exemplary embodiment described hereinabove, when the sipe blade 10 is in the assembled position, the interior space 22 is created between the interior frontal surfaces 12a, 14a of the bodies. There is no direct contact between the two frontal surfaces 12a, 14a. In this exemplary embodiment, the interior space 22 is delimited and closed by the tongues 30 to 36 and by the frontal surfaces 12a, 14a of the body.

Figure 5:
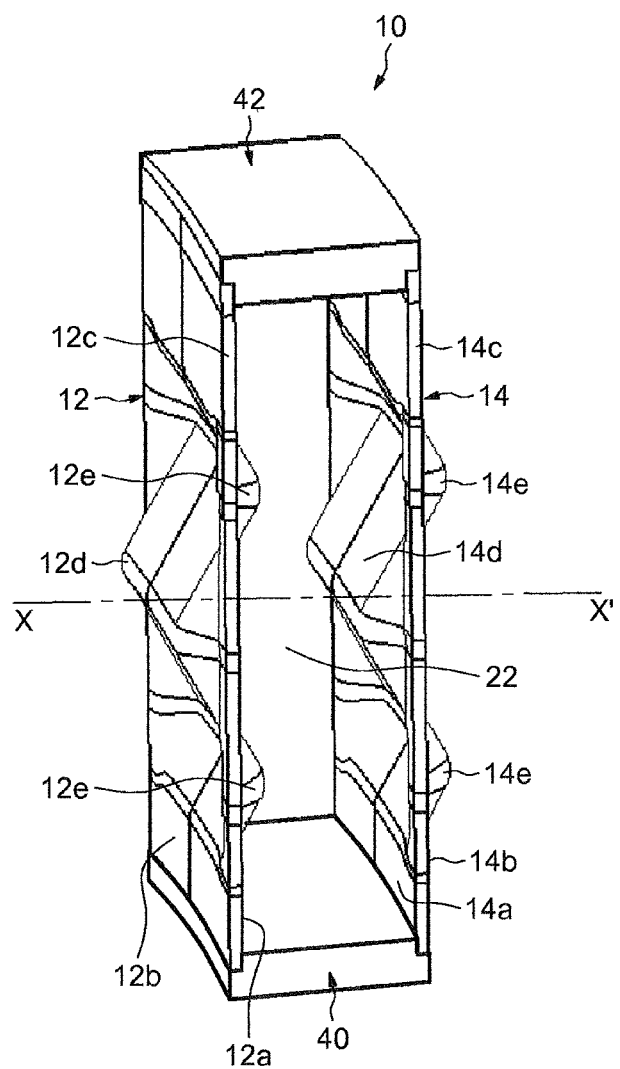
FIG. 5 is a perspective view of a lining element according to a third exemplary embodiment.

The exemplary embodiment illustrated in FIG. 5, in which identical elements bear the same references, differs from the first exemplary embodiment described in that the composite sipe blade 10 comprises, in place of the intermediate frame, two bases 40, 42 mounted at the longitudinal ends of the bodies 12, 14. Such a configuration is for example suitable for obtaining a sipe blade 10 that has an overall thickness greater than that of the first exemplary embodiment without the need to stack several intermediate frames between the two bodies 12, 14.

Each base 40, 42 comes to bear, on one side, against the body 12 and, on the other side, against the body 14. The bodies 12, 14 are kept apart by means of the bases 40, 42. Each base 40, 42 comes to bear, on one side, against the interior frontal surface 12a of the body 12 and, on the other side, against the interior frontal surface 14a of the body 14. Each base 40, 42 is interposed between the interior frontal surfaces 12a, 14a of the bodies and extends transversely between the said surfaces. Each base 40, 42 also covers the facing transverse sides of the peripheral edges 12c, 14d of the bodies. The securing of the bases 40, 42 to the bodies 12, 14 may be achieved by any appropriate means, for example by welding.

In the exemplary embodiment illustrated in FIG. 5, the interior space 22 delimited by the bases 40, 42 and by the frontal surfaces 12a, 14a of the body is open laterally on each side. In order to completely close off this space 22 from the outside, each sipe blade 10 may further comprise two assembly plates (not depicted) forming caps which are attached to the bodies 12, 14 and to the bases 40, 42.

Following manufacture, the lining sipe blade 10 may be secured to one of the segments of the associated mould, by anchoring. A lateral anchor zone of the sipe blade 10 is completely embedded within the mould segment. Thus, as an alternative to the exemplary embodiment of FIG. 5, it would be possible to provide a sipe blade design comprising a single assembly plate so as to leave the interior space open laterally on that side of this anchor zone that is intended to be completely embedded in the mould segment.

Figure 6:
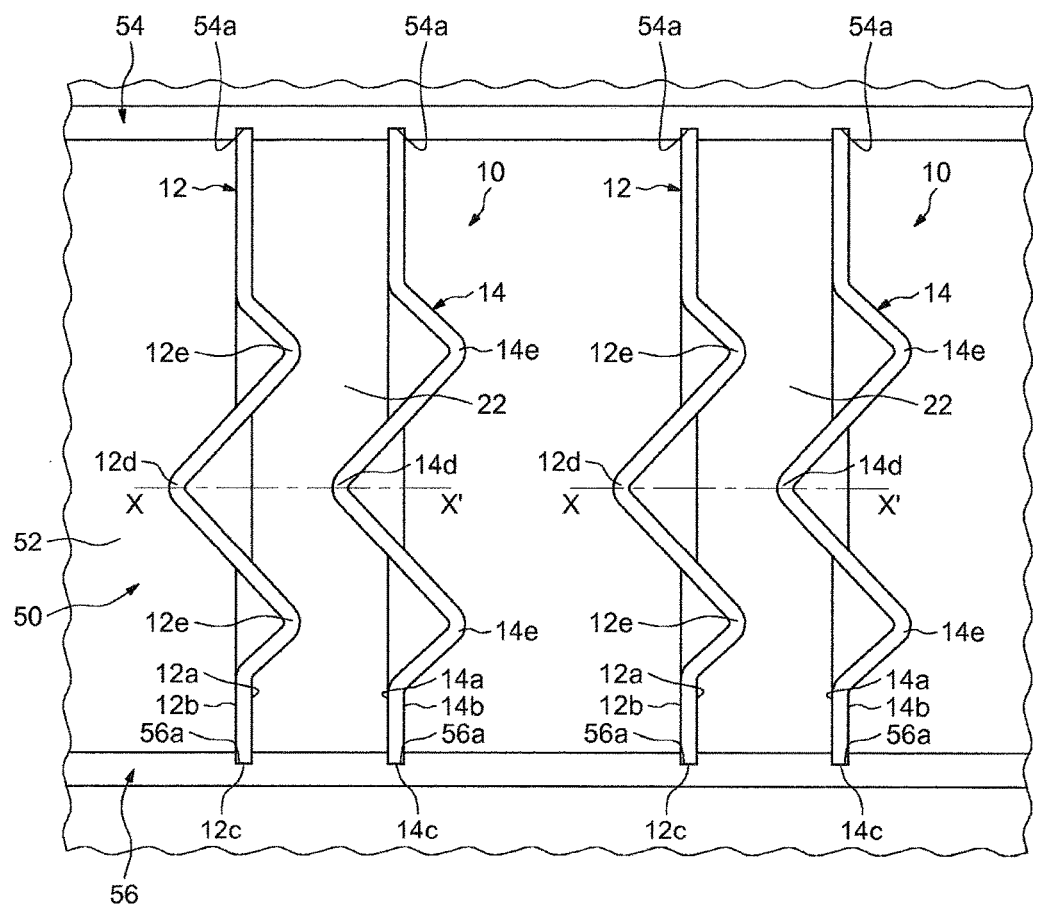
FIGS. 6 and 7 are partial views from above illustrating a mould segment comprising lining elements according to a fourth exemplary embodiment.

FIG. 6 partially depicts a manufacturing mould segment 50 on which composite sipe blades 10 are mounted. By comparison with the previous exemplary embodiment, the sipe blades 10 of this embodiment have no support bases. Each sipe blade 10 comprises an assembly plate (not depicted) forming a cap closing off laterally, on one side, the interior space 22 delimited between the interior surfaces 12a, 14a of the bodies. Each assembly plate of a sipe blade is mounted bearing against one of the longitudinal sides of the peripheral edge of each body 12, 14 of the said sipe blade. The bodies 12, 14 are secured to the assembly plate by any appropriate means, for example by welding. The assembly plate keeps the interior surfaces 12a, 14a of the bodies in the separated position. The assembly plate may be flat. The assembly plate may also comprise a projecting portion interposed between the interior frontal surfaces 12a, 14a of the associated bodies.

The mould segment 50 comprises a moulding surface 52 intended to mould part of the tread surface of the tire that is to be manufactured. The segment 50 here comprises two spaced-apart bars 54, 56 projecting from the moulding surface 52. The bars 54, 56 are intended to mould grooves in the tread of the tire. The bars 54, 56 are parallel to one another.

Each composite sipe blade 10 is secured to the segment 50 by being anchored on the bars 54, 56. The sipe blade 10 extends between the bars 54, 56. Each bar 54, 56 comprises housing slots 54a, 56a in which the longitudinal end portions of the bodies 12, 14 of each sipe blade 10 are anchored, for example by force-fitting. The bodies 12, 14 of each sipe blade 10 extend perpendicular to the bars 54, 56. For each sipe blade 10, each longitudinal side of the peripheral edge of each body 12, 14 left free, i.e. without an assembly plate bearing against it, is mounted against the moulding surface 52, or anchored in an associated slot formed on this surface. In the position in which the sipe blade 10 is secured to the segment 50, the assembly plate of the sipe blade is arranged on the opposite side of the body 12, 14 to the moulding surface 52.

Figure 7:
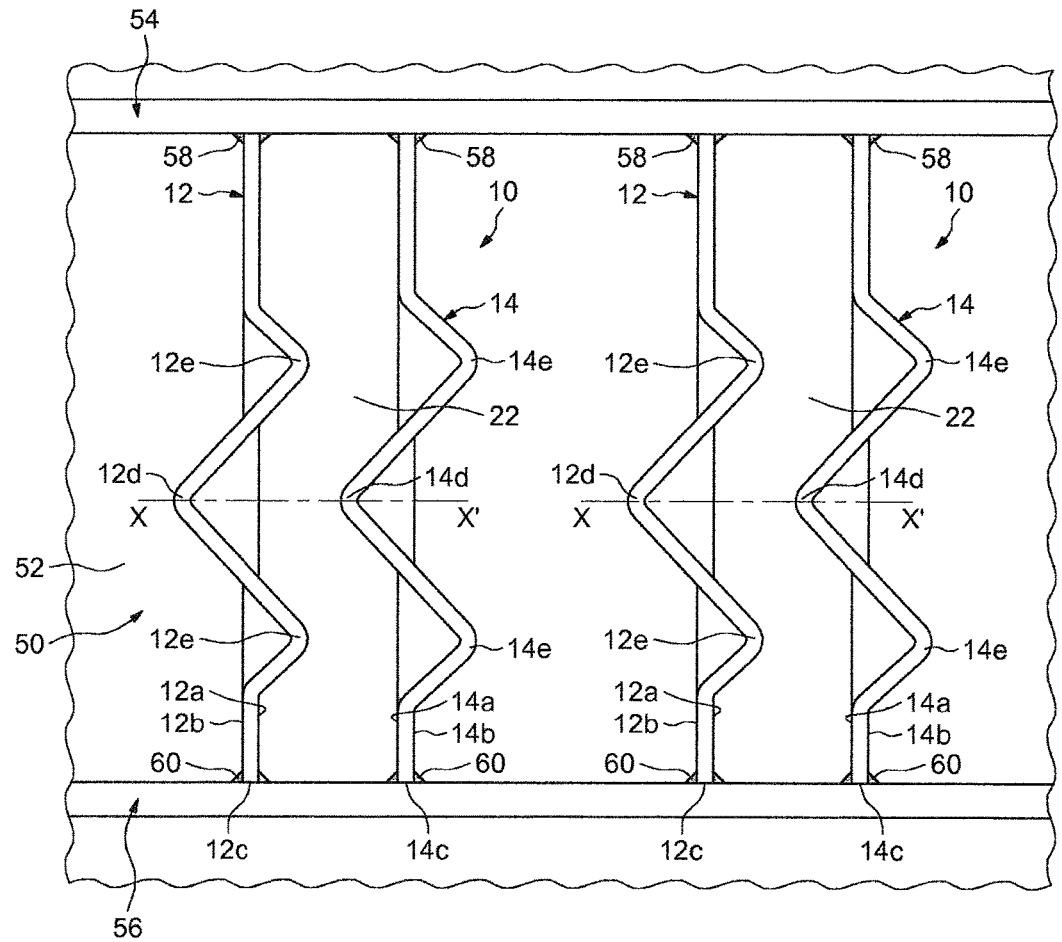

As an alternative, as illustrated in FIG. 7, in which identical elements bear the same references, the longitudinal ends of the bodies 12, 14 of each sipe blade are mounted only bearing against the bars 54, 56. In order to secure the bodies 12 and 14 of each sipe blade 10 to the bars 54, 56 of the segment, beads 58, 60 of welding are provided. Alternatively, the securing of each sipe blade 10 to the bars 54, 56 could be achieved by any other appropriate means, for example by bonding.

In another alternative form, each composite sipe blade 10 could be secured to a single bar of the mould segment. In this case, each sipe blade 10 may comprise, on the opposite side to this bar, a support base 40, 42 as illustrated in the embodiment of FIG. 5, or alternatively a tongue 34, 36 as illustrated in the embodiment of FIGS. 3 and 4.

In the exemplary embodiments illustrated, the bodies 12, 14 of the sipe blade are assembled while being completely separated from one another. As an alternative, it would be possible to envisage a different design of the sipe blade such that, in the anchor zone intended to be inserted into the associated segment of the mould, the bodies 12, 14 are mounted bearing against one another. Thus, with such a design, the bodies 12, 14 are kept apart only in that zone of the sipe blade that is intended to project into the interior moulding space of the mould.

In the exemplary embodiments illustrated, the interior space 22 formed when the bodies 12, 14 of the sipe blade are in the separated position is left empty. Alternatively, it would be possible to fill this space of the sipe blade with a filling material, for example a low melting point alloy, in order to avoid problems of insulation or of expansion of air under the effect of temperature during the moulding of the tread of the tire.

In the exemplary embodiments illustrated, the two bodies of the composite sipe blade have protuberances making it possible to form, at least in part, the one same tread pattern in the tread of the tire. The shape and/or profile of the sipe blade bodies which have been illustrated in the figures are entirely nonlimiting and may be adapted according to the design of tread pattern desired.

The invention has been described on the basis of a lining sipe blade that makes it possible to form a sipe in the tread of the moulded tire. As an alternative, the invention may also be applied to another type of lining element intended to be attached to a support block of the mould, for example a bar.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A composite lining element for a tire mould comprising:
   first and second bodies which are able to mould, at least in part, a same tread pattern in a tread of a tire and each delimiting an exterior moulding surface and an opposite interior surface,
   the composite lining element further comprising assembly means for assembling the first and second bodies, the interior surfaces of the bodies being kept by the assembly means at least locally in a separated position that creates an interior space that is closed from the outside.

2. The composite lining element according to claim 1, wherein the assembly means collaborates with end portions of the first and second bodies.

3. The composite lining element according to claim 1, wherein the assembly means extends at least in part transversely with respect to the first and second bodies.

4. The composite lining element according to claim 1, wherein the assembly means is interposed at least in part between the interior surfaces of the first and second bodies.

5. The composite lining element according to claim 1, wherein the assembly means is shaped and arranged on the first and second bodies in order to delimit the interior space in conjunction with the interior surfaces of the bodies.

6. The composite lining element according to claim 1, wherein the assembly means comprises at least one peripheral frame interposed between the interior surfaces of the first and second bodies.

7. The composite lining element according to claim 1, wherein the assembly means comprises at least two tongues facing each other, wherein each of the two tongues extends from one of the interior surfaces of one of the first and second bodies and bears against the other body.

8. The composite lining element according to claim 7, wherein each tongue is formed integral with the body or attached to the body.

9. The composite lining element according to claim 1, wherein the interior space is delimited only by the interior surfaces of the first and second bodies.

10. The composite lining element according to claim 1, comprising at least one synthetic material filling the interior space.

11. The composite lining element according to claim 1, wherein the first and second bodies are identical to one another.

12. A tire mould comprising a plurality of lining elements according to claim 1.

13. Method for manufacturing a composite lining element for a tire mould, comprising the following steps:

a) cold-forming operations to obtain first and second bodies which are able to mould, at least in part, a same tread pattern in a tread of a tire, and then
b) assembling the first and second bodies using a means of assembly that locally keeps interior surfaces of the bodies in a separated position that creates an interior space that is closed from the outside.

14. A composite lining element for a tire mould comprising:
first and second bodies which are able to mould, at least in part, a same tread pattern in a tread of a tire and each delimiting an exterior moulding surface and an opposite interior surface,
the composite lining element further comprising assembly means for assembling the first and second bodies, the interior surfaces of the bodies being kept by the assembly means at least locally in a separated position that creates an interior space, and
at least one synthetic material filling the interior space.

15. The composite lining element according to claim 14, wherein the assembly means comprises at least one peripheral frame interposed at least in part between the interior surfaces of the first and second bodies.

16. The composite lining element according to claim 14, wherein the assembly means comprises at least two tongues facing each other, wherein each of the two tongues extends from one of the interior surfaces of one of the first and second bodies and bears against the other body.

17. The composite lining element according to claim 16, wherein each tongue is formed integral with the body or attached to the body.

18. The composite lining element according to claim 14, wherein the assembly means collaborates with end portions of the first and second bodies.

19. The composite lining element according to claim 14, wherein the assembly means extends at least in part transversely with respect to the first and second bodies.

20. A tire mould comprising a plurality of lining elements according to claim 14.

* * * * *